(12) United States Patent
Fellows

(10) Patent No.: US 6,385,972 B1
(45) Date of Patent: May 14, 2002

(54) THERMOACOUSTIC RESONATOR

(76) Inventor: Oscar Lee Fellows, P.O. Box 201207, Austin, TX (US) 78720-1207

(*) Notice: Subject to any disclaimer, the term of this patent is extended or adjusted under 35 U.S.C. 154(b) by 0 days.

(21) Appl. No.: 09/655,521

(22) Filed: Sep. 5, 2000

Related U.S. Application Data (60) Provisional application No. 60/151,349, filed on Aug. 30, 1999.

(51) Int. Cl.[7] ................................................ F01B 29/18
(52) U.S. Cl. ........................ 60/517; 60/522; 60/526
(58) Field of Search ........................ 60/517, 520, 521, 60/522, 526, 721; 62/6, 467

(56) References Cited

U.S. PATENT DOCUMENTS

| | | | |
|---|---|---|---|
| 4,114,380 A | * 9/1978 | Ceperley | 60/721 |
| 5,251,448 A | * 10/1993 | Rodger | 60/520 X |
| 5,953,920 A | * 9/1999 | Swift et al. | 60/520 X |
| 6,032,464 A | * 3/2000 | Swift et al. | 60/520 |

* cited by examiner

Primary Examiner—Hoang Nguyen (57) ABSTRACT

A Thermo-Acoustic Resonator (TAR) is a miniature thermoacoustic heat pump and thermal-electric generator that is typically imbedded in a thermoplastic or metal package. The TAR converts a thermal gradient into electrical energy. It can range in size from that of a microchip, upward. The operable principle is that sensible and latent heat in a material can be pumped most efficiently when pumped at intervals that are resonant with the natural period of the material at a given temperature, thereby increasing the energy density of the thermoacoustic engine. The normal period of the device is tailored to produce thermodynamic oscillation in the heat exchangers and working fluid, and thereby to cause a miniature armature to reciprocate within a magnetic field and generate alternating current. Power output depends on the amplitude and frequency of the thermal gradient, and the tailored energy flow rate through the device.

20 Claims, 6 Drawing Sheets

THERMOACOUSTIC RESONATOR

This application claims the benefit of the Provisional Application 60/151,349, filed on Aug. 30, 1999.

BACKGROUND OF THE INVENTION

The subject invention originates from twenty-two years research by the inventor, into engines and resonators that operate on the principles of thermoacoustic physics. For purposes of this application for patent, the term "thermoacoustic" refers to traveling energy impulses, normally detected as pressure fluctuations, propagating along velocity vectors, that move thermal energy through an elastic medium that is typically a compressible working fluid. For purposes of this application for patent, thermoacoustic energy includes both shockwaves (supersonic and hypersonic pressure waves) and sound waves (pressure waves traveling at the sonic velocity of the working fluid under locally extant conditions).

The research background data in heat, acoustic wave phenomena and gas mechanics includes the shock tube research performed by government and institutional scientists during the 1950's and 1960's, relevant examples of which can be found in the *Proceedings of the Seventh International Shock Tube Symposium*, University of Toronto Press 1970, ISBN 0-8020-1729-0; as well as research into thermoacoustic waves generated by chemical explosives, *The Chemistry of Powder and Explosives*, Volume I, 1941, Volume II, 1943, by Tenney L. Davis, Ph.D., ISBN 0913022-00-4; published research in atmospheric physics, including *Lightning*, by Martin A Uman, McGraw-Hill 1969; *The Flight of Thunderbolts*, $2^{nd}$ ed., B. F. J. Schonland, Clarendon Press 1964; *Graphic Survey of Physics*, by Alexander Taffel, Oxford Book Company 1960; *Matter and Motion*, by James Clerk Maxwell, 1877, Dover Publications 1991 (reprint); *Laboratory Exercises in Physics*, Fuller and Brownlee, Allyn and Bacon 1913; *Laboratory Experiments in Elementary Physics*, by Newton Henry Black, Macmillan Company, 1944; *Modern Physics*, by Williams, Metcalfe, Trinklein and Lefler, 1968, Holt, Rinehart and Winston Publishers; *Physics of Lightning*, D. J. Malan, The English Universities Press Ltd., 1963; which includes thermoacoustic phenomena generated by natural lightning and man-made electric arcs.

Other relevant published research includes work in pulse tube refrigeration, including *The Influence of heat Conduction on Acoustic Streaming*, Nikolaus Rott, Journal of Applied Mathematics and Physics (ZAMP), vol. 25, pp. 417–421, 1974; *A Review of Pulse Tube Refrigeration*, Ray Radebaugh, Cryogenic Engineering Conference, pp. 1–14, 1989; *Flow Patterns Intrinsic to the Pulse Tube Refrigerator*, J. M. Lee, P. Kittel, K. D. Timmerhaus, R. Radebaugh, National Institute of Standards and Technology, pp. 125–139, 1993. The cryogenics department at NASA-Ames is a premier focus of pulse tube refrigeration research. Pulse tubes differ from thermoacoustic devices in that they are typically non-resonant devices in which a mechanical piston, driven by an external power source, generates compression waves (pulses) that move in one direction through a series of heat exchangers, and cause thermal energy to be transported between those heat exchangers. Pulse tubes are typically used in cryogenic refrigeration applications. Pulse tubes are similar to thermoacoustic devices in that traveling pressure waves in a working fluid are the mode of operation.

The research history involving prime movers with associated thermoacoustic characteristics includes *Stirling Cycle Machines*, by Graham Walker, PhD, 1973, Oxford University Press; various Stirling engine technical research reports, 1937–1978, issued by The Philips Company Laboratories, Eindhoven, Netherlands; and *Stirling Cycle Engines*, by Andy Ross, 1977, published by Solar Engines, Phoenix, Ariz.

The device described herein is a traveling-wave Thermoacoustic Cycle (TAC) engine-generator set, herein referred to as a Thermoacoustic Resonator (TAR), comprised of an acoustically resonant cavity containing a multiplicity of thermally resonant heat exchangers and a compressible working fluid, in which a train of acoustic traveling waves is generated, and in which said acoustic traveling waves are amplified by a thermal gradient across the device, causing an increase in pressure and temperature amplitudes, and wave propagation velocity, and said acoustic traveling waves impinge upon a moveable piston-armature assembly, causing it to reciprocate within a magnetic field and generate electrical energy.

Thermoacoustic Cycle (TAC) engines are well known to acoustic science, are in USPTO Class 310 and International Class H01L 041/08, and have been explored extensively by Peter H. Ceperley, George Mason University; Steven Garrett of Penn State University and Gregory Swift of Los Alamos National Laboratory. Thermoacoustic related patents searched include:

| | | | |
|---|---|---|---|
| 6,054,775 | Apr., 2000 | Vocaturo | 290/1R |
| 6,032,464 | Mar., 2000 | Swift, et al | 60/517 |
| 5,953,920 | Sep., 1999 | Swift, et al | 60/520 X |
| 5,892,293 | Apr., 1999 | Lucas | 290/1R |
| 5,673,561 | Oct., 1997 | Moss | 62/6 |
| 5,659,173 | Aug., 1997 | Putterman, et al | 250/361 |
| 5,647,216 | Jul., 1997 | Garrett | 62/6 |
| 5,519,999 | May., 1996 | Harpole, et al | 60/520 X |
| 5,515,684 | May., 1996 | Lucas, et al | 62/6 |
| 5,456,082 | Oct., 1995 | Keolian, et al | 62/6 |
| 5,319,938 | Jun., 1994 | Lucas | 62/6 |
| 5,303,555 | Apr., 1994 | Chrysler, et al | 62/6 |
| 5,295,355 | Mar., 1994 | Zhou, et al | 62/6 |
| 5,275,002 | Jan., 1994 | Inoue, et al | 62/6 |
| 5,269,147 | Dec., 1993 | Ishizaki, et al | 62/467 |
| 5,263,341 | Nov., 1993 | Lucas | 62/6 |
| 5,165,243 | Nov., 1992 | Bennett | 62/6 |
| 4,722,201 | Feb., 1988 | Hoffler, et al | 62/467 |
| 4,686,407 | Auq., 1987 | Ceperley | 60/721 |
| 4,599,551 | Jui., 1986 | Wheatley, et al | 322/2R |
| 4,398,398 | Aug., 1983 | Wheatley, et al | 62/467 |
| 4,355,517 | Oct., 1982 | Ceperley | 60/721 |
| 4,114,380 | Sep., 1978 | Ceperley | 60/721 |

A Thermoacoustic Cycle engine is typically comprised of a resonant cavity in the approximate shape of a cylinder, tube or torus, in which a working fluid resides, and in which an applied difference in thermal potential, across internal isothermal heat exchangers that are separated by a regenerative heat exchanger (stack) and spaced along the length of the resonant cavity by a nominal wavelength or fraction thereof, produce and amplify acoustic waves which transport thermal energy from one heat exchanger to another, and maintain a state of oscillation, or periodic thermal and acoustic flux, in the working fluid. To extract useful work from the engine, the oscillating pressure component can be applied to a mechanical member, such as a piston, in order to perform reciprocating work, and thereby used to perform tasks such as pumping fluids or generating electrical energy. The maxima, or peak pressure points in the traveling thermoacoustic wave train, also transport thermal energy in accordance with the pressure-temperature relationship in a gas, as described in Charles Law, and this property can be employed in a reverse entropy cycle to produce refrigeration.

Thermoacoustic Cycle engines have been researched for several decades, and researchers at the Los Alamos National Laboratory, the Naval Post Graduate School, The University of Texas, Penn State University and other institutions have written numerous research papers on the genre, primarily concerning standing-wave thermoacoustic physics. A standing-wave thermoacoustic refrigerator developed by Steven Lurie Garrett was flown aboard the space shuttle *Discovery* in 1991 as an experimental package. It is mentioned (project 511) along with this inventor's Acoustic Cycle engine (project 503) in the *1993 Rolex Awards For Enterprise*, published December, 1992. Currently, there are approximately thirty relevant patents in the field.

The most significant problem with prior art thermoacoustic engines and refrigerators is that they have a very low power density. They are typically much larger and more massive for the amount of output work they produce, than other types of engines and refrigerators. Until 1998, in disregarding non-resonant pulse tubes, most researchers working in the field, including Gregory Swift's Los Alamos group, concentrated their efforts largely on thermoacoustic engines that employed standing wave physics. The power output of standing wave systems is limited by the inherent physical characteristics, to wit; standing wave systems rely on the forward-going wave being inverted and reflected uniformly back along the resonator at nearly the same propagation velocity. If too much energy is extracted from the forward-going wave in the cold-side heat exchanger the propagation velocity of the return wave is changed, and the forward-going wave and the return wave will be out of phase, and will interfere with each other. This adds impedance to the cycle, and tends to damp the oscillation. This inherent characteristic severely limits the quantity of energy per cycle that is available to perform useful work, resulting in large engines with low power density.

Traveling-wave engines and pulse tubes, by comparison, do not rely on reflected waves to maintain system oscillation. Traveling-wave engines ideally propagate thermoacoustic energy in only one direction, eliminating the reflected wave, thus reducing the impeding effects of a change in wave propagation velocity on the system, and increasing the amount of useful energy that can be extracted from the system.

In 1998–99, Greg Swift of Los Alamos attempted to improve the art by coupling Ceperley's torus-shaped traveling-wave engine with a cylindrical standing-wave resonator, in an effort to produce greater output power from the traveling-wave component, without damping the standing-wave oscillator. Even so, the compound engine develops low energy density because the design still relies mainly on geometry to produce an engine that is acoustically resonant.

The subject invention described herein is a traveling-wave thermoacoustic engine that conquers the problem of low power density through use of a design methodology and fabrication process conceived and developed by the inventor, in which the specific heat and thermal conductivity of the heat exchanger materials and the working fluid are tailored, in accordance with the designer's desires, to derive a combination of properties that produce specific values of thermal energy capacitance and reactance.

Thermal capacitance is the property that determines the natural period of thermal energy oscillation in matter. The thermal capacitance of a specific artifact, such as a heat exchanger in a thermoacoustic engine, is determined by design, by manipulating elemental matter with known properties, to produce alloys and compounds with different properties, to wit; artifacts with unique properties of specific heat and thermal conductivity with relation to their temperature swing, mass and geometry. In some cases, pure elements can exhibit the required thermal capacitance for optimal operation of a thermoacoustic engine, but this will occur only in cases where the engine designer has specifically chosen to engineer the engine around the natural properties of an element, rather than for a useful purpose, and even in such rare cases, the designer must still manipulate the surface area per unit mass and the energy coupling factors between components in order to derive a working engine. In other words, when intentionally designed to do so, thermal capacitance regulates the periodic oscillation of energy within the solid-state materials and the working fluid of a thermoacoustic resonator.

The advantage of this thermal capacitance approach, and the improvement gained thereby to the prior art, is that the solid-state materials that comprise the heat exchangers exhibit thousands of times the volumetric energy density of typical working fluids, therefore, the greatest quantitative portion of the oscillating energy flux is concentrated in the solid-state materials, and when tapped by the subject design methodology, far exceeds the effect of the geometric dimensions of the resonator in determining the frequency of oscillation, the propagation velocity of the wave-train and the energy that can be extracted from the thermoacoustic engine. The effect of this design methodology and fabrication process on the energy density of the invention is so great that, in terms of power output per unit size, energy density is increased by two or three orders of magnitude, over those examples of the prior art in thermoacoustic engines that are known to the inventor.

BRIEF SUMMARY OF THE INVENTION

The principal improvement on prior art is a significant increase in power density. This is accomplished by the development of an applied engineering design and construction process, by the inventor, in which the Principle of Thermal Resonance of Materials, a property determined by the thermal energy capacitance of materials, is applied in a proprietary design methodology in order to manipulate the acoustic properties of a thermoacoustic machine by means of the periodic thermal energy properties of the heat exchanger materials and working fluids, in conjunction with the geometric design of the resonant cavity, rather than by means of the geometry of the cavity and the acoustic properties of the working fluid alone.

This Thermal Resonance of Materials Principle constitutes a new invention of process, a new art, by which periodic thermal energy flux in matter can be measured, calculated, predicted and manipulated, and these material properties used to increase the energy density of thermoacoustic engines. This principle and the affected material properties are described in U.S. Provisional Patent application No. 60, 151,349, Oscar L. Fellows, Inventor, Aug. 30, 1999.

In the subject invention, multiple heat exchangers reside within an acoustic cavity. A minimum of two heat exchangers is required. The hot-side heat exchanger ($HX_h$), which introduces thermal energy into the working fluid; the cold-side heat exchanger ($HX_c$), which removes thermal energy from the working fluid; and the thermal capacitor ($C_t$), a type of regenerative heat exchanger that acts as a thermal metronome. $C_t$ conserves energy in the cycle, aids in amplifying the traveling wave and helps sustain the thermoacoustic flux in the working fluid of the engine. In the minimal design described herein, $HX_h$ and $C_t$ comprise one unit with multiple functions.

This heat exchanger arrangement is similar to prior art, but the invention is novel in the design methodology and fabrication process of the heat exchangers, in that the geometry, physical properties and operating theory of said heat exchangers are based on the inventor's theory of thermal capacitance, and thermal resonance of materials principle.

Two of the heat exchangers, $HX_h$, and $HX_c$, are considered isothermal in that the external thermal gradient across them is considered steady state. In actuality, though the external energy source is ideally injecting energy into the engine at a steady rate, and the external energy sink is removing energy from the engine at a steady rate, the internal thermal gradient across $HX_h$ and $HX_c$ is in harmonic flux with the resonator frequency, and the heat exchangers are so designed. $HX_h$ introduces thermal energy into the working fluid, and $HX_c$ removes thermal energy from the working fluid in periodic pulses. These pulses are coincidental with the traveling thermoacoustic waves.

Traveling waves transiting $HX_h$ and $HX_c$ inside the engine cavity, periodically present to the heat exchangers a mass of working fluid that is high in density, high in energy amplitude and high in thermal conductivity. In between these periods of high density, are intervals when the working fluid in contact with the heat exchangers is relatively low in density, low in energy content and low in thermal conductivity. When the energy gradient and the relative thermal conductivity are greatest, energy flows between the working fluid and the heat exchangers. When the energy gradient and thermal conductivity are least, the energy flow is least, and results in a dwell period. Another way of looking at it is that traveling waves remove thermal energy from $HX_h$ and deposit it in $HX_c$.

These propagating energy pulses, if graphed as a waveform, will appear to be inversely proportional in amplitudes between genesis and decay, or rise and fall times, appearing as a saw tooth waveform in which the rise and fall times of the wave are inverted on opposite sides of the wave maxima, the slope of the amplitude vector. In practice, the rising and falling amplitude angles will be slightly asymmetrical. The approximate waveform is illustrated in the graph labeled "Energy Cycle in Thermal Capacitors." These cyclical heat exchangers operate in harmony with, and amplify, an injected waveform to produce a high amplitude fluctuating thermal pressure gradient across the resonator.

As in provisional patent application No. 60, 151,349, Oscar L. Fellows, Inventor, Aug. 30, 1999; construction of this invention applies a design process methodology developed solely by the inventor, which shall now be described in depth.

The design of the heat exchangers, $C_t$ in particular, involves specifically tailored and manipulated Thermal Resonance of Materials properties, and specific geometry, that make them thermally resonant at a desired frequency, and thereby establish the acoustic period of the engine and working fluid. In other words, the materials are tailored so that they exhibit a natural period of energy oscillation that establishes a synchronous thermal energy flux in the working fluid.

To further clarify, this design process methodology takes into account those material properties that combine to produce thermal capacitance, and permits accurate design of passive and active components so that they acquire and discharge thermal energy to and from a working fluid in harmonic resonance with the acoustic period of a traveling wave, when the working fluid is at the desired operating temperature and pressure. The elemental properties of the solid materials are adjusted by doping with other materials to form compounds with specific thermal properties, by surface treating components to create a desired surface effect, and by creative geometry, such as forming metal structures of reticulated foam or plates that exhibit desired surface area to mass and volume ratios. This particularly affects $C_t$, in which the swing in thermal energy amplitude is greatest.

The physical properties of the matter comprising the heat exchangers and working fluid, such as their specific heat, thermal conductivity, thermal hysteresis, thermal capacitance, mass, cross-section, surface area, fluid mass-flow-rate, impulse frequency, dwell angle and propagation velocity determine the amount of thermal energy that can be stored in a given mass of material at a given temperature, and the rate at which said thermal energy is conveyed through the mass and coupled to the working fluid.

As stated above, these properties are rarely exhibited, in the correct interacting values for a given resonator, by pure elements. Compound components and alloys must be created to adjust these values. In some cases, the alloys must be surface treated by plating, ion implantation, plasma deposition and other means to bring the various values into specification. These physical properties, the physical dimensions and geometry of the materials, along with the quantity of thermal throughput energy, and various thermal and frictional impedances, determine the thermodynamic operation of the invention. The heat exchanger materials must absorb and emit thermal energy in harmonic step with the cyclic rhythm, or frequency, of the traveling wave.

The flow of thermal energy in the heat exchangers, particularly in $C_t$, exhibits many properties that are similar in effect to energy flow in an electrical capacitor. For example, thermal reactance and thermal hysteresis are caused by a combination of the change of specific heat of a given material over a temperature range, because it determines the amount of energy required to "charge" a given mass of the material up to a desired thermomotive potential (temperature); and the reciprocal change in the thermal conductivity of the material, which is the inverse of "resistance" to the flow of thermal "current". These variable properties determine the time required for a given quantity of energy to be conveyed through the materials, including the working fluid, of the resonator.

Materials store thermal energy by increasing the relative distance of their atomic orbitals, analogous to a population inversion in a laser cavity, wherein electrons are pumped to energy levels above the ground state. In the same way, specific heat is linked to atomic structure. So is thermal conductivity. Materials convey thermal energy via transfer of energy between adjacent atoms. The ionic and covalent bonds of materials vary, as do their specific heats, and the field strength of these bonds vary with distance, thereby changing the energy absorption properties of the materials with respect to the tension, or amplitude, of the charge. This phenomenon is linked to latent energy storage in matter, a phenomenon that is well documented in the scientific literature. Said phenomenon often precedes a change of state, said change of state including changes in energy fields, such as magnetism and quantum states.

In the following table, Cp=specific heat, k=thermal conductivity, and $\Lambda$=latent energy. Specific heat is in cal/ gm/C°, total and latent energy is in cal/gm, and thermal conductivity is in Watts/cm/C°.

TABLE SHOWING LATENT ENERGY OF SOME MATERIALS

| Material | $C_p$ @ 100K | $C_p$ @ 300K | k @ 100K | k @ 300K | Total Energy | Λ cal/gm |
|---|---|---|---|---|---|---|
| Aluminum | 0.115 | 0.215 | 3.00 | 2.37 | 43 | 20 |
| Beryllium | 0.049 | 0.436 | 4.138 | 2.18 | 87.2 | 77.4 |
| Magnesium | 0.016 | 0.243 | 1.69 | 1.59 | 48.6 | 45.4 |

In the materials shown, thermal conductivity varies inversely with specific heat, diminishing the value of the latent energy available per cycle. The thermal impedance in aluminum increases by twenty percent (20%) over the temperature range shown. This is not the case with magnesium, which exhibits a significant latent energy swing and almost no change in thermal conductivity. Magnesium then, is a better thermal capacitor, even though its specific thermal conductivity is less than aluminum, because it exhibits less reactance and hysteresis than aluminum. Beryllium may be the best choice, for though its conductivity is cut in half over the temperature range, latent energy increases by a factor of ten.

Examples of engineered materials with low reactance include iron lattices with grown silver whiskers. Such combinations exhibit entirely different properties from the individual metals. Doped silicon, glasses, ceramics, carbon compounds, metal oxides, carbides and deposited films are all appropriate materials, depending on the operating parameters desired in a TAR.

Each material, because of its engineered thermal capacitance and reactance, is resonant at a different frequency, a frequency at which the energy oscillation within the material reaches a maximum value. Because of these design characteristics, the energy levels in such materials can be pumped at a frequency that is resonant, or "natural", to a given artifact, causing it to exhibit a periodic swing in dynamic amplitude that is alternately significantly greater, and significantly less, than it would be in the same materials under non-resonant conditions. This increases the amplification factor. This property of thermal energy swing amplification is adjustable, by means of changing the pumping period of the energy source, and by changing the energy resonance, or more properly the internal capacitance, of the artifact, via manipulation of the physical properties and geometries of the materials.

Viewed in terms of thermal energy flow rate (power), this amplification is a manifestation of the inherent non-linear relaxation period, the dwell period, or more appropriately the energy-leveling period, of a given material that is undergoing a change in temperature in which both latent and sensible energy is being transferred. It holds true for fluids as well as solids. The inherent leveling period, which is determined by the changing values of specific heat and thermal conductivity, determines the quantitative energy flow per unit of time, the frequency at which a substance may be pumped in order to achieve the greatest energy swing amplification.

As can be seen in the table, because of its large ratio of latent capacity to total energy, and its relatively unchanging thermal conductivity, magnesium has a shorter dwell period than aluminum, and less memory, or hysteresis, at the bottom of its energy well. The change in the apparent specific heat, and the relatively fixed thermal conductivity of the material, result in a high rate of energy transfer, and a greater amplification of the pressure-temperature oscillation of the wave than can be attributed to simple conduction between the heat exchangers and the working fluid. These properties are of little benefit in conventional steady state flow thermal systems, but become extremely important in high frequency cyclical systems such as thermoacoustic and Stirling Cycle engines.

A simpler way of looking at the invention is in terms of apparent overall system impedance. In the prior art, a regenerative heat exchanger creates a small but abrupt change of temperature and pressure within the thermoacoustic wave, a transition in energy amplitude, altering its acoustic wavelength, phase angle and wave propagation velocity. The result is a small periodic pressure-temperature swing between the isothermal heat exchangers that can be output as useful work, and the wave becomes slightly asynchronous (out of phase), losing waveform symmetry. This has heretofore been viewed as a necessary, but performance-limiting, impedance, both in standing wave and traveling-wave prior art. The inventor's design process maintains the synchronicity of the traveling wave in relation to the energy transfer capabilities of the heat in exchangers, by application of this thermal resonance of materials principle, thereby reducing apparent overall system impedance and producing a greater amount of output work, in comparison to the total internal energy flux of the engine, than is possible with the prior art. This is essentially impedance matching through resonant coupling. The resulting increase in energy density over the prior art is measured in multiple orders of magnitude.

In the preferred embodiment, $C_t$ and $HX_h$ are physically coupled into a single component. $C_t$–$HX_h$ acts as both the metronome and the heat injection point, the primary thermal oscillator. The external input energy to $C_t$–$HX_h$ is preferably isothermal, but the internal extension of $C_t$–$HX_h$, that portion in contact with the internal working fluid, exhibits thermal capacitance, an engineered tendency to resonate internal energy at a particular frequency, and is induced by the signal injection means to couple with the working fluid in such a way that it takes up energy from the external source and injects it into the working fluid in a periodic oscillatory manner. This material resonance principle causes the injected signal to be reinforced and amplified more effectively than can be accomplished with the simple addition of thermal energy, as is the case with prior art. It operates in conjunction with $HX_c$, the working fluid and the injected acoustic wave train, to establish the resonant period of the resonator. As a separate component, $C_t$ can also be configured as a regenerative device that reduces the amount of waste energy rejected through the cold-side heat exchanger by extracting a portion of the energy from the wave before it is rejected to $HX_c$, and reintroducing it to succeeding waves before they enter $HX_h$, as wave preheat energy. This energy conserving function can reduce the total input-to-output energy ratio of the engine, and increase overall thermal efficiency.

These components, their novel arrangement, and the proprietary design process applied in the making of them, as described below, tend to reduce the physical size and increase the power density, operating efficiency, cost effectiveness and design predictability of the invention, thereby improving the art toward widespread commercial applications. The invention, including the design process, operating theory and design characteristics described herein, is a thermoacoustic, microelectromechanical system (MEMS) that uses acoustic waves to transform thermal energy into electrical energy. In function, the device is a micro miniature traveling wave Thermoacoustic Cycle engine and generator, and is herein referred to as a Thermoacoustic Resonator (TAR).

Described simply, the TAR is an acoustic cavity containing a compressible working fluid, in which an injected train of traveling waves is amplified by manipulating the thermal flux within the device, and the resulting periodic pressure fluctuation in the working fluid performs work on a freely reciprocating piston-armature assembly. The invention physically incorporates said reciprocating piston-armature assembly, electrical conductors, a magnetic field generating means, a signal injection means and multiple heat exchangers into the acoustic cavity. The heat exchangers in the TAR are separated by a substrate that is a thermal insulator, also called a thermal break, that reduces short-circuit thermal conduction between components with differing temperature gradients, in order to limit the path of maximum throughput energy exchange, as much as possible, to the working fluid. The component parts of the TAR are disposed within an integral case, or housing. The housing is preferably comprised of metal, though ceramics and thermoplastics can also be used. The TAR can be further encapsulated within an external package, to meet varying conditions of use.

TARs can be made in single autonomous units. Multiple unitary TARs can be ganged together to form an array. Multiple TARs can also be manufactured as an integrated panel array, on a common substrate, with a common housing, a common power conditioning circuit, and connected by printed wiring. A single TAR can range in size from approximately that of a microchip, with a piston less than one-fourth centimeter in diameter, to more than ten centimeters in diameter. As shown in the table labeled TAR.WKS, power output depends on the physical dimensions of the pistons and heat exchangers in the device, the static pressure of the working fluid, the magnetic field strength, the thermal gradient across the device, the energy throughput the frequency of the internal pressure fluctuations, the travel of the attendant piston-armature oscillating within the magnetic field, and the electrical capacity of the internal conductors.

In operation, a thermal gradient is established between the external isothermal heat exchangers by heating and cooling means, and coupled to the TAR housing. A train of acoustic impulses, also called traveling waves, is injected by the signal injection means and causes the piston-armature to begin oscillating. As the internal components of the TAR attain normal operating conditions, the energy amplitude of the traveling wave increases, converting the heat supplied by the thermal energy source into an electrical output current.

The frequency of operation is determined by the engineered properties of all the heat exchangers, and to a lesser extent, by the geometry of the acoustic cavity. The propagation velocity of the traveling waves is determined by the nature and operating conditions of the working fluid. Said traveling waves propagate through the working fluid from $HX_h$ to $HX_c$, transporting thermal energy between the two. Said traveling waves take up energy from one heat exchanger, causing said traveling waves to increase in pressure and temperature amplitude in accordance with Charles Law, and reject energy via another heat exchanger. The amplified traveling waves cause a large fluctuation, or oscillation, in the pressure of the working fluid. The oscillation in pressure in the working fluid causes the piston-armature assembly to reciprocate within a magnetic field, and generates an electric current in an electrical conductor. Said electrical conductor is connected to the separate sides of the TAR casing by electrically conducting means, so as to form opposite polarity terminals, in order to convey the electrical energy from within the TAR to an external load.

The outer opposing flat surfaces of the TAR housing are designed for contact with the isothermal heat exchangers by which both thermal and electrical energy enter and exit the TAR. The TAR can be configured so that one or both electric poles are isolated from the thermal casing, if desired. This is a minor detail, and not intrinsic to the operation of the TAR.

Thermally conductive strips can also be bonded to the opposing faces of the TAR casing during manufacture, as a means to connect the TAR to heat source and heat sink. The TAR can then be potted in a non-conductive package, with the conductive strips exposed. The conductive strips can be omitted by bonding the TAR directly to conductive hot and cold plates (external heat exchangers), with the TAR sandwiched between the plates. This works well for ganged arrays designed to achieve a multiplied power output.

The preferred manufacturing methods for the micro miniature TARs include the formation of the internal heat exchangers, thermal breaks and wiring by those techniques common to the semiconductor industry, including photolithography and chemical machining, ion implantation, doping, material deposition and laser ablation, much like large scale integrated circuits are created on computer chips. Integrated TAR thermal-to-electric generator panels with specific power conditioning and load capacities can be produced by these means.

When affixed to a blackened metal absorber panel, or other radiant-energy absorbing material, and to a cooling means on its opposite face, the TAR can convert heat from radiant energy, such as sunlight, into electrical energy. In this respect, the TAR responds to a wider bandwidth of radiant energy than photovoltaic cells. It can absorb and use wavelengths that are below the photovoltaic threshold for most materials. It is possible to configure the device to absorb and convert electromagnetic energy such as radio waves and microwaves into a different wavelength, such as 60 Hertz power, by first converting the absorbed energy to heat.

The TAR can operate across a wide temperature range. The operating range with common materials is from 100 Kelvins to 1200 Kelvins. Higher temperatures, and thus a wider absolute range, are possible with development of TARs using advanced materials, such as ceramics, special composites and high-temperature metal alloys.

Energy conversion efficiencies are directly related to the temperature gradient across the TAR. A theoretical (Carnot) efficiency of 92% (1200K−100K/1200K=0.9167), and realizable efficiencies of 58% (0.92*0.63=0.58) are possible within the nominal limits of current materials and architecture.

Thermal energy is admitted to, and emitted from, the TAR via conduction and radiation, at the outer case surfaces of the device. The external case surfaces of the TAR operate as isothermal heat exchangers. The interior side of the heat exchangers is comprised of a matrix, which is of the proper mass, specific heat, thermal conductivity and surface area to alternately store and transfer the thermal energy to and from the working fluid within a period of time that "matches" the thermal resonance period of the TAR heat exchangers.

A variety of working fluids are employed in the manufacture of TARs. Each working fluid has unique physical properties. Air and helium are the working fluids preferred for the TAR An example of the calculations involved in determining the working fluid charge is given below:

The acoustic velocity of a compression wave in air is:

$$V = \ddot{O}1.4p/d$$

Where p is the pressure and d the density. The coefficient, 1.4, will vary with the type of working fluid employed. As shown below the velocity of propagation of the traveling high-density wave, also varies directly with temperature.

$$V = V_o \ddot{O}1 + t/273$$

$$V = V@STP + nt$$

Where velocity is meters/second, n is a coefficient of velocity change for a given working fluid per unit change in temperature, and t is temperature in $C^o$.

When the dimensions of the working fluid passages, which comprise the resonant cavity, are matched to the acoustic velocity of the working fluid under given dynamic temperature and pressure parameters, and with the thermal reactance of the thermal capacitors, a resonant frequency, or natural harmonic period of oscillation, is established for the device. Operation under these conditions yields maximum efficiency. In the design of the TAR, physical size limitations and the energy throughput required for a particular application are the principal determinants of the resonant frequency of the working fluid passages, and therefore, their length and diameter for a given resonant frequency.

The fundamental frequency of an air column in a closed pipe, for example, is:

$$n_o = V/4L$$

V is the wave propagation velocity and L is the length of the air column. In practice, an empirical correction proportional to the diameter of the tube is applied for greater accuracy. The approximate dimensions of the gas passages would then be calculated by the following formula:

$$\text{Wavelength} = (L + 0.4d)$$

where d is the diameter of the gas passage and L the length. These formulas can be found in the 55th edition of the CRC Handbook of Chemistry and Physics.

For maximum efficiency, the armature must reciprocate at the resonant frequency of the working fluid, and the traveling wave must arrive at the reflecting surfaces of the moving piston-armature assembly, in phase with it. The piston-armature assembly is a reciprocating mass, with an oscillation period designed to coincide with the resonant frequency of the working fluid under extant conditions. If a resonant condition between the armature and the acoustic velocity of the working fluid does not exist, a sub-optimal operating efficiency will result. This condition will cause the compression wave to be out of phase with the motion of the armature and the device will tend to damp its own oscillation and hence reduce its efficiency.

The period required for transit of thermal energy through the heat exchangers and thermal capacitors must be calculated so that these components also accrete and discharge thermal energy in phase with the acoustic wave train. Mass flow rates through the matrices of these components, specific heat of the materials and their thermal conductivity determine their porosity, web thickness and area per unit volume. In this transient-flow cycle, these factors translate into thermal capacitance ($C_t$), thermal reactance ($X_t$) and thermal impedance ($Z_t$).

The period required for complete energy leveling in a heat exchanger or thermal capacitor is divided into five parts, or five time constants. This is done because the rate of energy exchange between components is not linear, and work or power is measured as the rate of flow per unit of time. In any such non-linear system, peak power is usually achieved by cycling the system in a period that is less than the complete energy-leveling period. In the TAR, the rate of energy exchange between components during the first time constant is sixty-three percent (63%) of the available energy. To extend the working cycle for four additional time constants, in order to harvest the remaining thirty-seven percent (37%), would decrease the overall power of the system. The rate of energy exchange changes logarithmically, and this is why thermal reactance and hysteresis are critical. For example, if total available energy is 100 Joules, 63 Joules will flow during the first time constant, 23.3 Joules during the second time constant, 8.63 Joules during the third time constant, 3.2 Joules during the fourth time constant, and 1.87 Joules during the fifth time constant. If the thermodynamic cycle is one time constant in duration, the average rate of flow, or power, is 63 Joules per cycle. If the cycle is two time constants in duration, the average rate of flow is 63+23/2=43 Joules per cycle. Therefore, the system has a greater power output if the cycle is limited to one time constant in duration.

Figure 8:
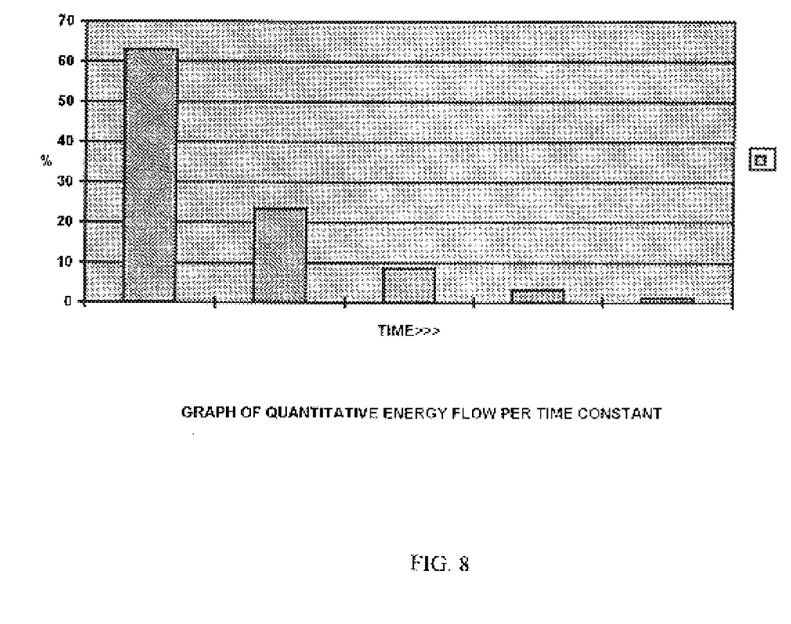
FIG. 8 is a graph of quantitative energy flow per time constant.

As illustrated in the graph in FIG. 8, during each time-constant, 63% of the energy remaining in the energy donor is transferred to the energy recipient. The actual quantity depends upon temperature swing and duration of the swing, and the change in specific thermal conductivity and specific heat of the elements of the system over the temperature swing. This design knowledge permits specification of all heat exchangers in the machine so that they are closely matched to the energy transfer cycle desired through the machine, since it takes the acoustic velocity of the working fluid and the thermal impedances of all other interacting elements into account.

---

In a periodic flow system, the ($X_t$) of any component will be the average of the angle of the amplitude and period of the energy transferred during the half-cycle. This will always be 0.63 of the available energy. The available energy is a factor of the reactance and hysteresis of the material. The value of the available energy in one time-constant is used in the inventor's formula to calculate the optimum quantity of energy exchanged in a given period in a transient-flow cycle. There are five time-constants in the cyclic swing between the minimum and maximum energy storage capacity of an element, during a period of alternating amplitude energy exchange. This number is the resulting coefficient multiplied against the Carnot number that yields the nominal actual performance of the device.

Other factors, such as frictional losses within the gas passages, non-ideal gas behavior of the working fluid, cross-conduction of thermal energy, tangential reflection of acoustic energy and other impedances can affect the actual final energy conversion efficiency.

---

The elements in the system appear to the energy flow as thermal impedances ($Z_t$), the $Z_t$ of as an individual element being determined by its $X_t$, hysteresis and the acoustic resonance of the system. Overall system impedance is determined by the system designer, the object being to design for minimal $Z_t$, and synchronous, or harmonic operation among all the interacting elements. The point expressed here is that the parameters of all the system elements interplay to create the machine's performance, and that by using the inventor's proprietary design methodology, these parameters can be calculated to achieve consistent, optimum results.

The TAR is physically comprised of three principal sections; the hot-side heat exchanger, the cold-side heat exchanger; and sandwiched between them, a non-conductive thermal break. The thermal break serves as a substrate into which the component parts of the TAR are assembled. It contains passages for the working fluid, and a centrally located cavity that houses a piston-armature assembly, said piston-armature assembly comprised of a piston-armature suspension, armature electrical conductors and a field magnet structure. These three principal sections are housed, or sandwiched, between two separate layers that comprise an electrically and thermally conductive outer casing, or envelope. In the case of multiple TARs manufactured as an integrated panel array on a common substrate, the outer casing will be comprised of contiguous conductive layers laminated to both sides of the non-conductive substrate, which is a contiguous thermal break, to form a single panel, with said multiple TARs and their connecting printed wiring sandwiched between. The TAR components and the working fluid are disposed within the casing.

$C_t$–$HX_h$ is a specially engineered heat exchanger, bonded to one side of the case. It couples the thermal source energy to the internal working fluid of the TAR. $C_t$–$HX_h$ exhibits thermal resonance properties that couple most efficiently with traveling waves of a specific frequency, and less efficiently with the stagnant medium (the working fluid) through which said traveling waves propagate.

A multiplicity of holes, or ports, extend through the thermal break in order to communicate thermoacoustic energy between the hot side heat exchanger and the cold side heat exchanger. The traveling waves exit $C_t$–$HX_h$ at an amplified temperature and pressure, and continue on through the connecting ports in the thermal break, through connecting passages, toward the piston-armature assembly. Said piston-armature assembly and passages are separated from the cold-side heat exchanger ($HX_c$) by an inertance plate. The traveling waves are slowed and phase shifted between the piston-armature assembly and the inertance plate, where peak pressure is attained, and they perform work on the piston-armature assembly, causing the piston-armature assembly to reciprocate in step with the pressure fluctuations of the working fluid, and convert said pressure fluctuations into electrical energy.

Thermal energy remaining in the traveling waves is metered through the orifice in the inertance plate, into the internal matrix of the cold-side heat exchanger ($HX_c$), where the remaining energy is transmitted, via conduction, through the thermally conductive outer casing of the TAR to an external heat sink.

When the high-pressure maxima of the wave train are within the cavity between the piston-armature assembly and the inertance plate (the dwell cavity), the low-pressure node is within $HX_h$. The piston-armature assembly resists the pressure of the traveling wave, pushing it back toward $HX_h$, and also pushing it through the metering orifice of the inertance plate into $HX_c$. Stirling Cycle compression occurs in the dwell cavity for a period corresponding to eight to twelve degrees (8°–12°) of the cycle. The cooler pressure wave tends to rebound, driven both by the displacement of the rebounding armature mass and the physical oscillation caused by the changing pressure in the working fluid, back into Ct–HXh, The TAR engineer strives to extract maximum energy to the piston-armature assembly, to dump whatever remains of the energy into HXc, and to minimize the reflected wave, which represents impedance.

The energy in the return wave is counter to the velocity vector of the wave train, and if improperly controlled, will conflict with succeeding traveling waves entering Ct–HXh from the signal injecting means. The TAR engineer strives to time the arrival of the reflected wave so that it arrives at Ct–HXh during the nodal portion (minimal energy flow) of the injected signal, thereby reducing destructive impedance and reinforcing the oscillation.

The drop in system pressure, caused by the loss of energy through $HX_c$, now offers a large thermal gradient across $HX_h$, and energy flows to the working fluid, causing a rapid increase in temperature and pressure within $HX_h$, and generating a new, high density wavefront that moves through the device toward $HX_c$, thereby repeating the cycle.

Figure 9:
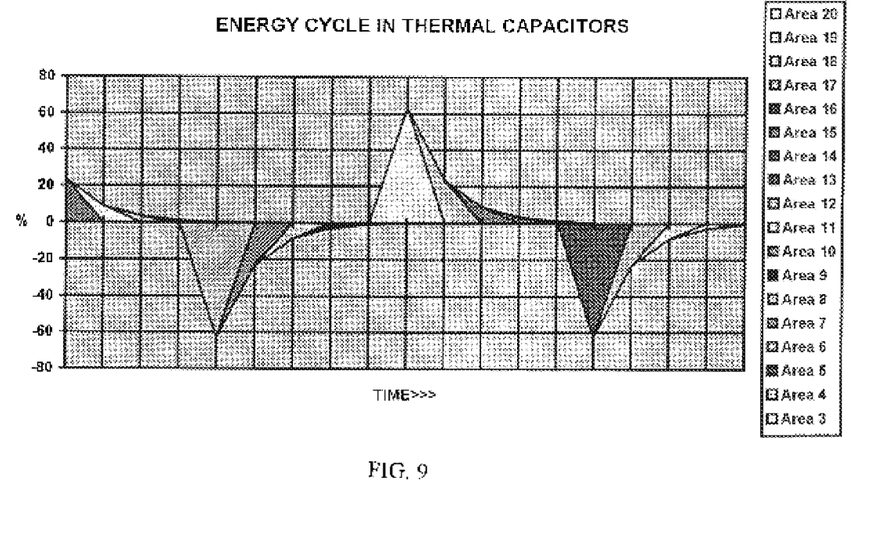
FIG. 9 is a graph showing energy cycle in thermal capacitor.

The periodic oscillation and energy exchange that takes place within the internal elements is illustrated in the graph in FIG. 9. The time-constants inherent in the energy exchange are also depicted. The amplitude, or swing, of the temperature and pressure gradients is greatest across Ct–HXh, but the energy exchange through HXc, and the oscillation period of the piston-armature must coincide with the rising and falling pressure of the traveling wave in order to realize peak efficiency from the device. The graph shows approximately one-and-two-thirds cycles.

The function of Ct–HXh is to transfer an external energy stream to an internal working fluid in a periodic manner, in order to maximize the pressure swing in the cycle, and to establish the baseline period of the oscillating pressure-temperature gradient of the traveling wave.

In operation, the piston-armature assembly synchronously reciprocates with the oscillations in pressure. The armature is comprised of magnet-steel laminates and electrical conductors so disposed that they cut the lines of magnetic flux created by the magnetic field generating means, and produce an electric current in said electrical conductors. The armature is suspended between the poles of the magnetic-field generating means, a permanent magnet or electromagnet, by mechanical bearings and the flexible suspension of the piston. The fluctuating pressure gradient within the working fluid causes the armature to reciprocate within the magnetic field, thereby causing an electric current to be induced in the armature conductors. Said electric current is conveyed, via conducting means, from the armature to the outer casing of the TAR, and to an external load.

In the working cycle, thermal energy is transferred from the hot-side heat exchanger to the cold-side heat exchanger via traveling waves that traverse the working fluid in periods of typically less than a few milliseconds. At a frequency of ten kilohertz (10 kHz) for example, the period of sonic oscillation is one hundred microseconds (100 uSec).

Gas pressure in a confined volume increases with increases in temperature on the order of (1/273 units, or 0.0037 per $K^0$. For example, a static pressure of 10 kg/cm$^2$ will become 13.8 kg/cm$^2$ with a 100 $C^0$ increase in temperature. This pressure fluctuation of 3.8 kg/cm$^2$ will result in a force that is a multiple of the area it acts upon, which in this case, is the area of the piston.

For example, assume the area of the piston is one square centimeter, and the resultant force is: (1 cm$^2$*3.8 kg/cm$^2$= 3.8 kgf). Assume that the piston travel is 2.0 millimeters and the TAR is operating at a frequency of 5340 HZ. The TAR in this example will develop theoretical work of approximately 40.5 kg-m/sec, or 400 Watts. If the hot-side temperature is 500K, and the cold-side temperature is 400K, the Carnot efficiency will be:

$$E = T1 - T2/T1$$

$$500K - 400K/500 = 0.20$$

Our thermal capacitance theory gives a maximum of sixty-three percent (0.63) of Carnot:

$$0.20 * 0.63 = 0.126, = 12.6\% \text{ eff.}$$

Therefore, our 400 Watts of potential becomes (400*0.126 =) 50 Watts. Not bad from a disk that fits in the palm of your hand.

If the temperature delta is increased to 300° C., for example:

700K−400K=300K/700=0.429

0.429*0.063=0.27, or 27% eff.

400 Watts*0.27=108 Watts

Some of the design parameters and dynamic resultants for an arbitrarily sized TAR are illustrated in the table (TAR.WKS) shown below:

easily carry one to two amperes. The number of turns of the winding, the frequency of oscillation and the field strength of the magnet structure will determine the developed voltage, or electromotive force (EMF), produced by the TAR. A ribbon conductor will increase current capacity by permitting greater cross-sectional area for a given length coil.

When all the aforementioned elements are factored in with the thermal and mechanical limitations of the materials, a one-centimeter TAR, with external heat sinks of appropriate capacity, will support several Watts of throughput. Power will increase with size, because larger conductors and more robust mechanical elements can be employed. For example, an 11.3 cm diameter TAR can handle approximately a

| TABLE SHOWING ENERGY OUTPUT FOR A GIVEN SET OF OPERATING CONDITIONS TAR.WKS ||||||||
|---|---|---|---|---|---|---|---|
| HEAD TEMP Deg K. | SINK TEMP Deg K. | DELTA-T Deg K. | STATIC-P kg-cm2 | FINAL-P kg-cm2 | DELTA-P kg-cm2 | PISTON DIA cm | PISTON AREA cm2 |
| | | | 1 atm = 1.0335 kg/cm2 | | | | |
| 450.000 | 330.000 | 120.000 | 2.067 | 2.985 | 0.918 | 1.325 | 1.379 |
| PISTON STROKE Cm | PISTON DISPLACEMENT cm3 | GAS PASS. DIA. meters 10 pass. × 2 mm | LENGTH OF GAS PASSAGE meters | RESONANT FREQUENCY OF PASSAGES (1/4 wave) HZ | SONIC VEL OF GAS meters/sec | KGF kg | DENSITY OF GAS IN WAVEFRONT kg-m3 |
| 0.200 | 0.276 | 0.020 | 0.050 | 5340.283 | 1238.946 | 1.265 | 0.858 |
| MASS FLOWRATE REQUIRED kg/hr | MASS FLOWRATE ACTUAL kg/hr | KG-M/SEC | POWER kW | THROUGHPUT kW | CARNOT EFF % | ACTUAL EFF CARNOT*0.63 | HORSE-POWER |
| 4.562 | 4.548 | 13.516 | 0.133 | 0.789 | 26.667 | 16.800 | 0.178 |
| WORKING FLUID | SONIC VEL. meters/sec @ 273K | Sp Ht kJ/kg*K | Sp Gr kg/m3 @STP | WKG FLUID Charge (kg) | GAS PASS. VOL. m3 | VOLUME OF TAR m3 | |
| Helium | 965.000 | 5.188 | 0.164 | 0.000005 | 0.000016 | | |

The actual value of work produced by the TAR is limited by internal losses such as frictional impedance in the gas passages and heat exchangers, and the mechanical and electrical limits imposed by the physical size of the device. In a device of one centimeter diameter, for example, the armature winding must employ a wire conductor of very small cross-section in order to obtain a sufficient number of turns to produce a nominal voltage within the tiny magnet structure, and the current-carrying capacity of the small conductor limits the actual output. In the micro miniature sizes, these constraints will become increasingly important to the design of the device. The conductors and heat exchange elements will be etched into materials a few microns in cross-section.

The most significant limiting factors with regard to operating life and generating capacity will be the mechanical strength and durability of the armature suspension, which is the only moving component, and the current carrying capacity of the armature winding. Regarding the suspension, similar operating conditions can be found in high-frequency audio speakers, called tweeters, which have commonly demonstrated intermittent duty lives in excess of twenty years. Regarding winding ampacity, a coiled ribbon conductor of copper or silver, 0.2 millimeter in cross-section, can kilowatt of throughput with a nominal conversion efficiency of 40%–50%. The micro-miniature sizes will typically be used in lower-temperature applications, where the temperature gradient across the TAR is small.

To summarize: In action, the TAR acts as a thermal-to-electric energy converter. In the process of conducting thermal energy from its hot-side heat exchanger to its cold-side heat exchanger, the device converts a portion of the thermal energy into electrical energy. In very small TARs (sub-centimeter diameter), where current requirements are low, the armature winding and magnetic field generating means can be replaced with a piezo-electric crystal, a component well known in science and industry, in which fluctuations in pressure generate a difference in electromotive potential across the crystal, and result in a small current flow.

In a reverse-entropy cycle, a gated electrical current can be applied to the TAR to cause it to pump heat through the device, thereby acting as a heat pump and producing refrigeration. When used as a miniature heat pump, the thermal efficiency of the device is again dependent upon the applied electrical impulses being of a frequency that is in phase with the thermoacoustic resonance of the internal components and the working fluid of the device, and the absolute temperatures of the thermal gradient across the device. The internal pressure is caused to fluctuate by the electrically induced motion of the piston-armature assembly, setting a wave train in motion, and thermal energy is admitted and rejected through the device in reverse direction to the flow when used as a thermal-electric generator, pumping thermal energy from a low-temperature source to a higher-temperature heat sink.

BRIEF DESCRIPTION OF THE SEVERAL VIEWS OF THE DRAWING

The TAR will be described with reference to drawings that are not to scale.

DETAILED DESCRIPTION OF THE INVENTION

Figure 1:
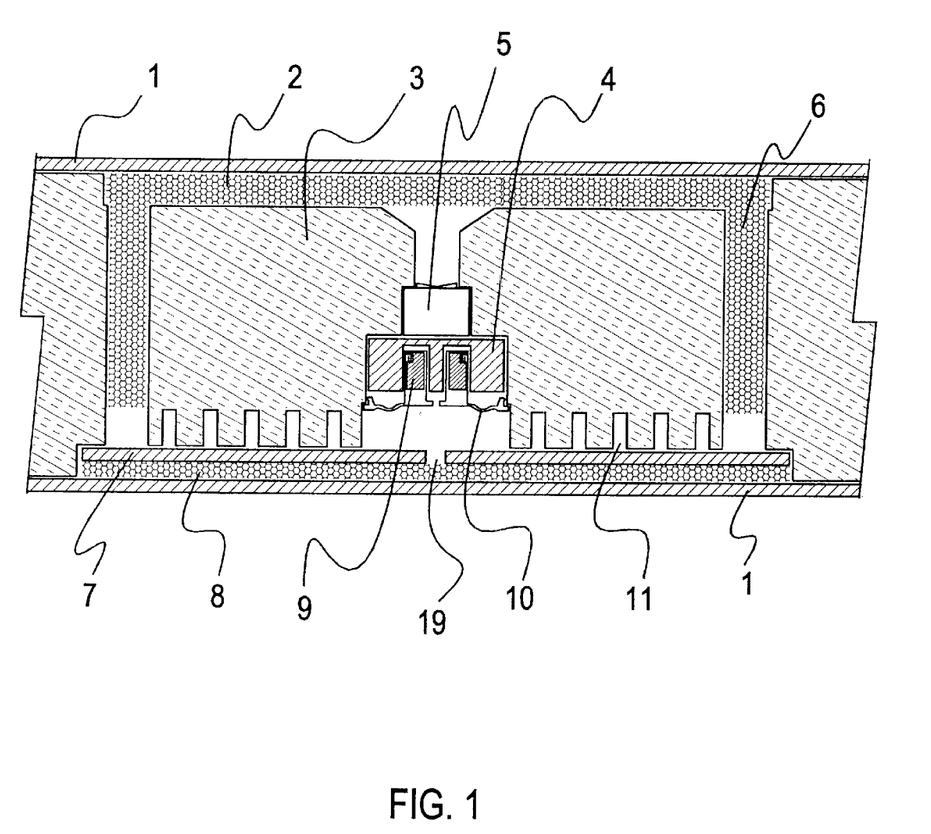
FIG. 1 is a cross-sectional view of a six-layer laminate comprised of a thermal break sandwiched between two layers of porous conductive material that are, in turn, sandwiched between two plates of solid conductive material that form the outer envelope casing of the device. The drawing portrays these elements as they have been formed from the compound laminate, from which the resonator is assembled, illustrating the working fluid passages, cold-side heat exchanger, hot-side heat exchanger, armature and magnet structure.

With respect to FIG. 1; the thermal break 3 is a thermal insulating means, preferably a material such as pressed fiber, ceramic or plastic, although other materials can be used, even metals that are poor conductors of heat. The purpose of the thermal break 3 is to minimize short-circuit thermal conduction between the two outer heat exchanger assemblies 2 and 8, and to reduce conductive losses and increase thermal-to-electric conversion efficiency. Heat exchanger elements 2 and 8 are comprised of thermally conductive materials that typically have a large surface area to volume ratio, and very thin cross sections, bonded to the external conduction surfaces 1 in order to transfer thermal energy from the energy source to the internal working fluid, and from the internal working fluid to the heat sink, very rapidly. The hot-side heat exchanger 2 and cold-side heat exchanger 8 differ in their geometry, to compensate for the physical property changes in the working fluid that are due to changing temperature, pressure and acoustic wave propagation velocity. The thermal break 3 has working fluid passages 11 that permit acoustic communication between heat exchangers 2 and 8 via connecting ports 6, thereby permitting rapid transit of pressure and thermal energy from one side of the thermal break 3 to the other. A layer proximate to the thermal break comprises an inertance plate 7 that separates the working fluid passages 11 from the cold-side heat exchanger 8. An acoustic wave generating means 5, that is driven by an external oscillator, emits a train of acoustic traveling waves that transit the hot-side heat exchanger 2, and radiate outward through the gas passages and the connecting ports 6 at the periphery of the thermal break, and back through the gas passages 11 on the opposite side of the thermal break 3, toward the dwell cavity where the armature piston 10 is disposed. After acting upon the armature piston, the stalled pressure waves exit the dwell cavity through a metering orifice 19 in the inertance plate 7, and subside into the cold-side heat exchanger 8, where they give up the remaining energy to a heat sink.

The pressure waves arriving in the dwell cavity between the armature piston 10 and the inertance plate 7 cause the armature assembly 9 to reciprocate within the magnet structure 4, which induces an electric current in the conductive coil integrated into armature assembly 9, and the resulting current is carried away to an external load by conducting means not shown.

Figure 2:
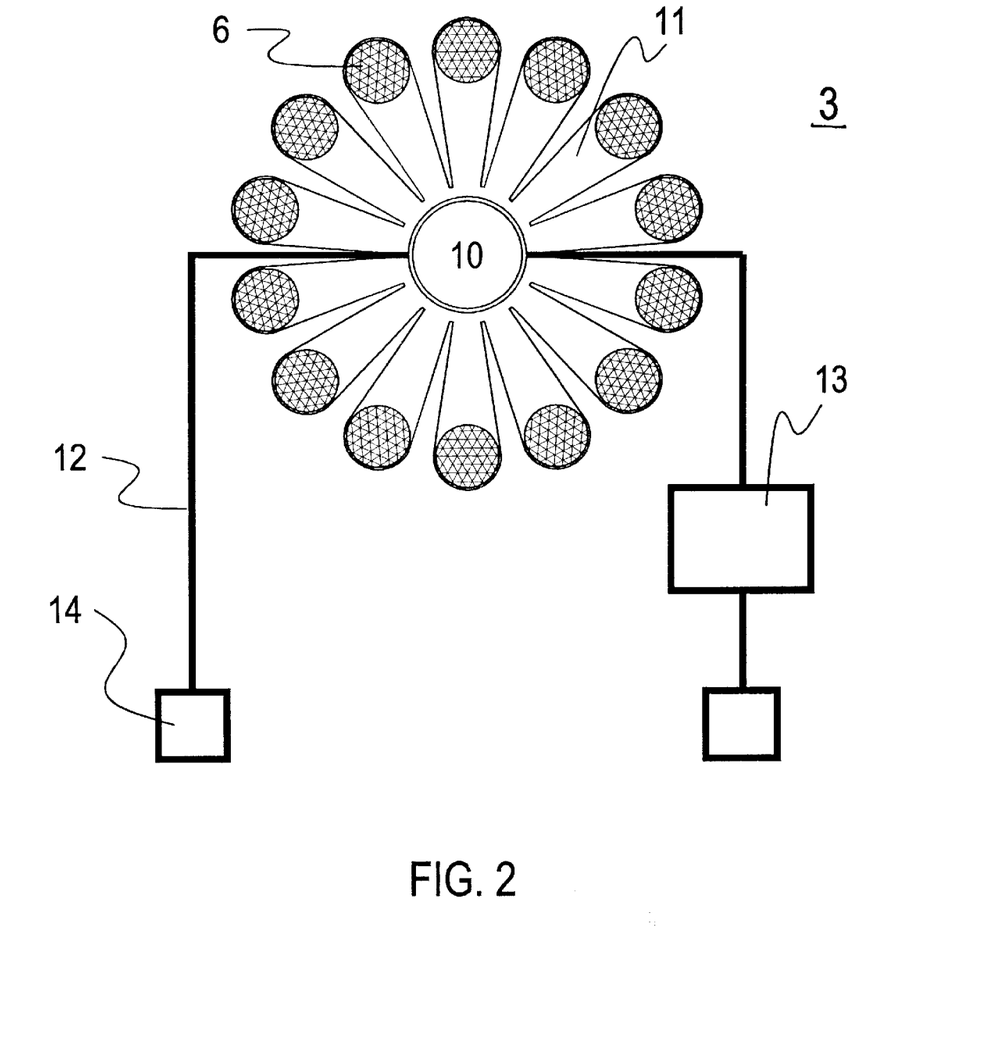
FIG. 2 is a planar view of the cold side of the resonator, showing a centrally located armature piston surrounded by a circular array of orifices that extend through the thermal break and connect the gas passages. Also shown, as a block, is the power conditioning micro-circuitry, and the buss connector pads. The face of the thermal break has gas passages recessed into it.

With respect to FIG. 2; a multiplicity of ports 6 extend through the thermal break 3, permitting acoustic communication between the armature piston 10 and dwell cavity, and the acoustic wave generating means. Traveling waves conveying energy flow through the thermal break 3 via said ports 6, to the opposite side. Printed wiring conductors 12 and junction pads 14 are located on the thermal break 3 for connecting the TAR to a common wiring buss not shown that exports the electrical energy generated by the armature of the TAR to an external load not shown. One of the conductors passes through a power conditioning means 13, shown here as a block diagram.

Figure 3:
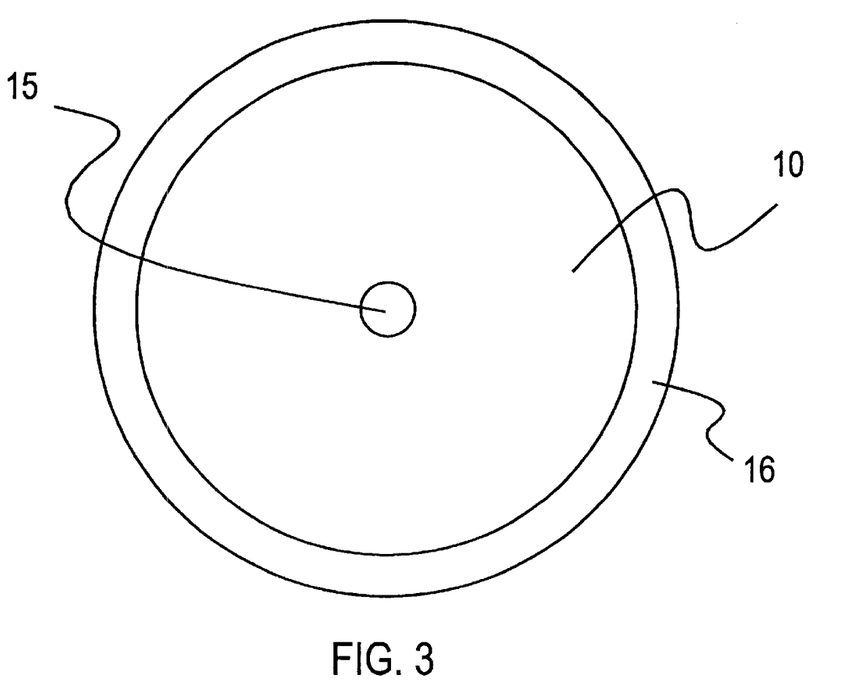
FIG. 3 is a planar view of the armature piston, showing the pressure relief orifice.

With respect to FIG. 3; the piston-armature assembly 10 has a suspension 16 that holds it securely in place in the thermal break, and centered in the magnet structure. The piston is ported 15 in the center to relieve pressure across the piston-armature assembly 10 when the TAR is idle, but is sufficiently small so that it does not substantially reduce piston travel, oscillation or energy output when the device is active.

Figure 4:
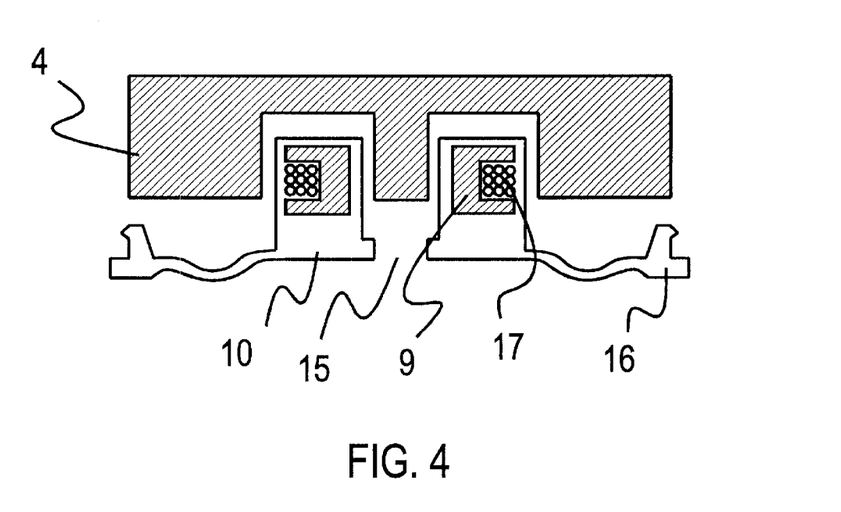
FIG. 4 is a cross-sectional view of an armature piston, coil assembly and magnet structure.

With respect to FIG. 4, the piston-armature assembly 10 and coil assembly 9 and 17, and the magnet structure 4, are shown in cross-section. The armature coil 17 is a small gauge conductor wound in a grooved ferrous ring 9. The piston-armature is cast, machined or molded to house the ring 9 and coil 17 assembly, and hold it in suspension, centered within the magnet structure 4. Movement of coil assembly 9 and 17 with relation to the fixed magnet structure 4 induces an electric current in the coil 17. The ends of the conductor 17 penetrate the armature-piston suspension 16 and exit the device to the external wiring and terminal pads.

Figure 5:
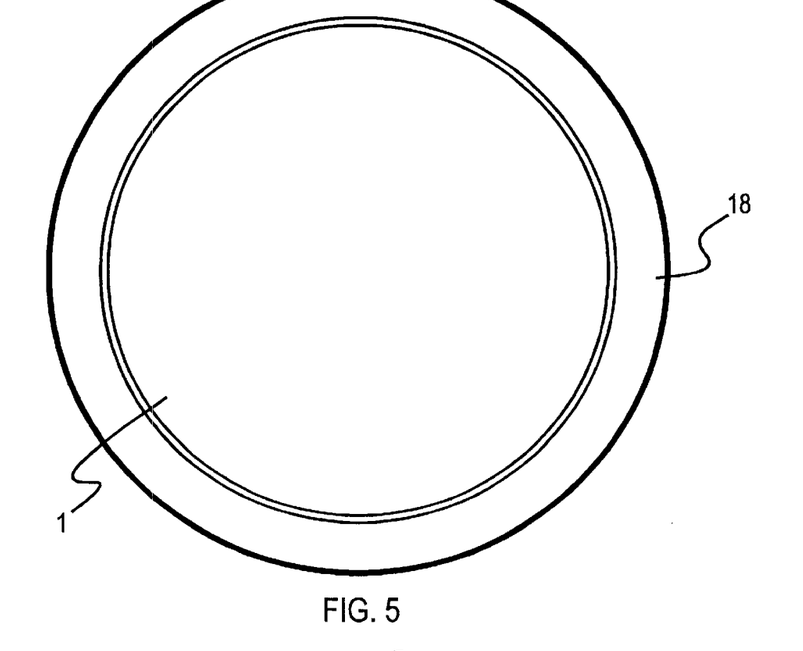
FIG. 5 is a planar view of an individually packaged TAR, fully assembled.

With respect to FIG. 5; a conductive housing 1 contains an individual TAR assembly. A perimeter ring 18 secures the two external heat exchangers to the center substrate as shown in FIG. 6.

Figure 6:
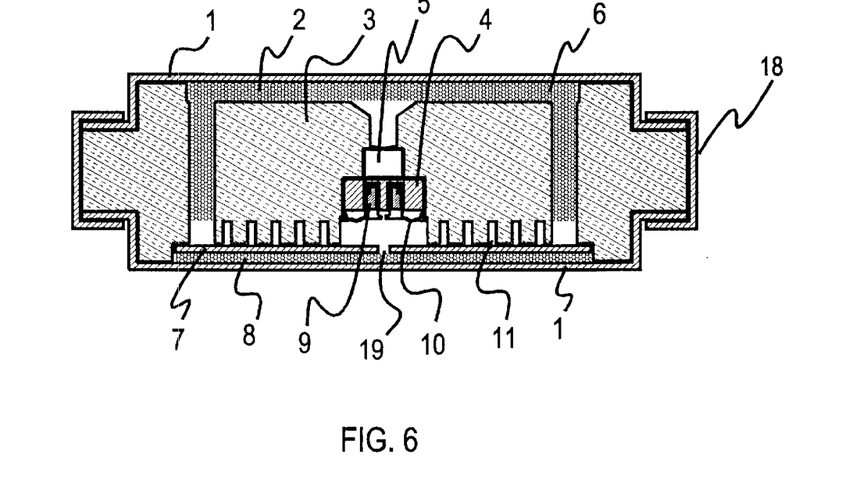
FIG. 6 is a cross-sectional view of an individually packaged TAR.

With respect to FIG. 6, an individual TAR is housed in a disk comprised of two halves of a thermally conductive outer case 1, held together around a central thermal break 3. The thermal break 3 has passages 11 for the working fluid to reside in, a central depression to contain the acoustic wave generating means 5, the piston-armature assembly 10, coil ring 9, magnet structure 4, and multiple ports 6. The inertance plate 7 with metering orifice 19 is disposed between the piston-armature assembly 10 and the cold-side heat exchanger 8. The hot-side heat exchanger 2 and cold-side heat exchanger 8 are contained in, and bonded to, the two outer conductive halves 1 of the device.

Figure 7:
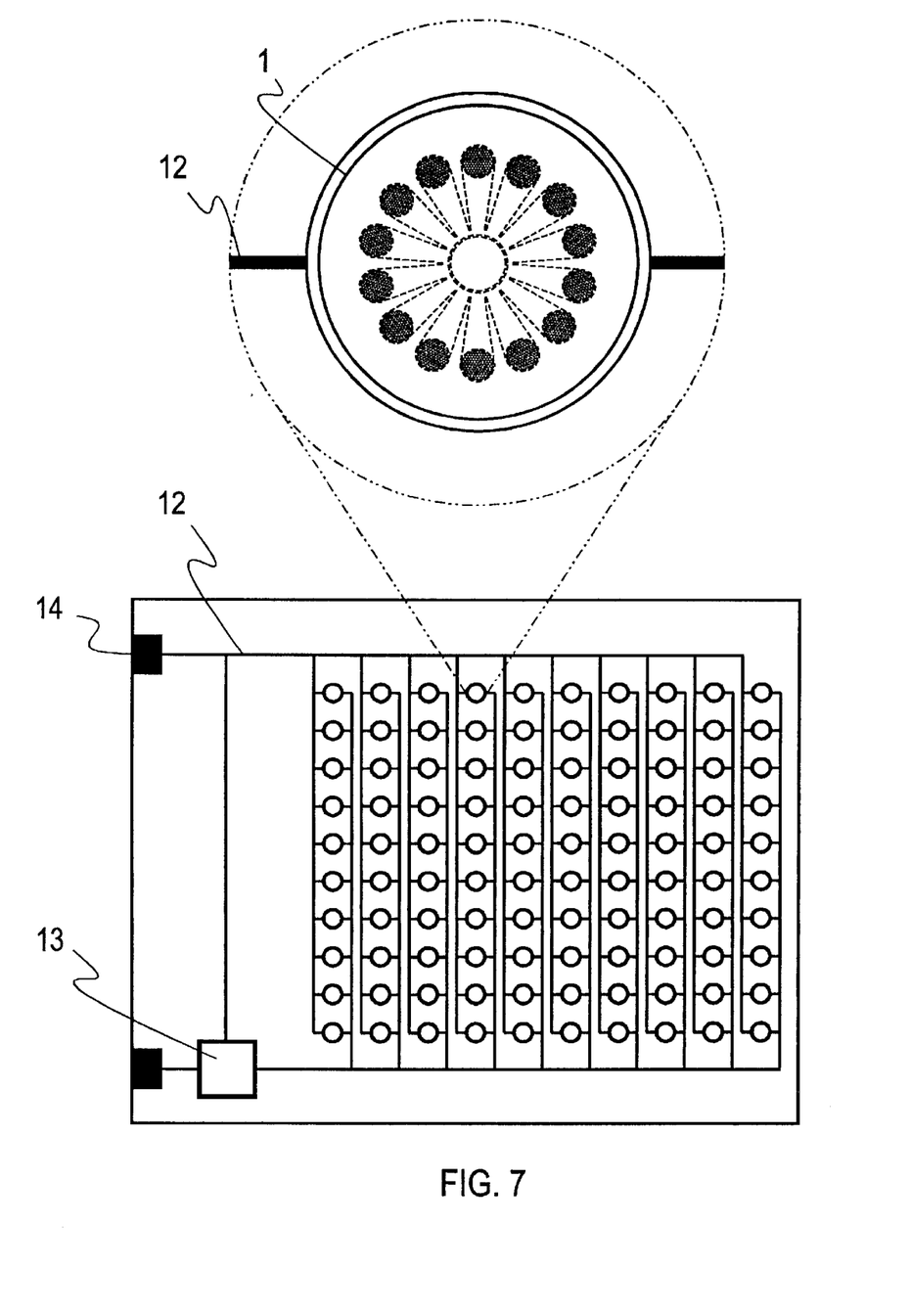
FIG. 7 is a planar view of multiple micro-miniature, ganged TARs, comprising a panel array module complete with printed wiring.

With respect to FIG. 7, a plurality of TARs are arrayed on a module board, complete with interconnecting printed wiring 12, a common power conditioning means 13, and common terminal pads 14. In this configuration, many miniature devices are ganged together, similar to a ganged array of photovoltaic cells, to form engineered power modules for specific purposes, such as converting solar radiation into electrical power for a spacecraft or utility grid. The TARs can be produced in this fashion for ease of quantity manufacturing, using processes and equipment similar to those processes and equipment commonly found in the manufacture of electronic integrated circuit semiconductor chips.

I claim:

1. A miniature heat engine comprising:
   a) a thermally conductive envelopment means including a housing for containing a compressible working fluid,
   b) said compressible working fluid being capable of supporting propagation of periodic acoustical traveling waves,
   c) a first heat exchange means for adding thermal energy to the working fluid in one section of the housing,
   d) a second heat exchange means for removing thermal energy from the working fluid in another section of the housing,
   e) a thermal insulating means comprising an intermediate substrate dividing said first and second heat exchange means, and for mounting component parts of the miniature heat engine,
   f) an acoustical traveling wave generating means for causing periodic acoustical traveling waves to propagate on a path through the working fluid in communication between said first and second heat exchange means,
   g) an acoustic wave guiding means, a wave-guide, contiguous with the acoustical traveling wave generating means and integral with the geometry of working fluid passages in the thermal insulating means and said first heat exchange means, by means of which the periodic acoustical traveling waves are vectored, thermally amplified, and acoustic-impedance-controlled,
   h) an energy conversion means for converting the acoustical energy produced by said miniature heat engine into other forms of electrical and mechanical energy,
   i) an inertance means, comprised of a planar baffle, for reducing the local propagation velocity of the acoustic traveling wave, and increasing the pressure gradient decay period during which energy is extracted from the working fluid by the energy conversion means and said second heat exchange means,
   j) a metering means for causing the admittance of cooler working fluid from said second heat exchange means, through the energy conversion means, into the acoustical traveling wave generating means, thereby completing an acoustic and thermodynamic circuit in the working fluid.

2. The miniature heat engine as claimed in claim 1, which can be manufactured as a single unitary device, or as a multiplicity of interconnected devices.

3. The miniature heat engine as claimed in claim 1, in which the thermally conductive envelopment means is comprised of two thermally conductive parallel plane surfaces separated by the thermal insulating means, said envelopment means comprising said housing which is in communication with the internal working fluid and the external environment for the purpose of transmitting thermal energy between said internal working fluid and said external environment.

4. The miniature heat engine as claimed in claim 1, in which the thermal insulating means divides the thermally conductive envelopment means into two separate sections which, in conjunction with the thermal insulating means, with said first heat exchange means in one section, said second heat exchange means in another section, and the thermal insulating means disposed between the sections so as to impede short-circuit thermal conduction between said first and second heat exchange means.

5. The miniature heat engine as claimed in claim 1 or claim 4, in which the thermal insulating means is penetrated by a multiplicity of through holes, ports, through which the periodic acoustical traveling waves communicate between said first heat exchange means and said second heat exchange means via the compressible working fluid.

6. The miniature heat engine as claimed in claim 1, in which said acoustical wave generating means comprising an electric-acoustic transducer, is located at a central recess in the substrate, and so disposed as to cause periodic acoustic traveling waves to propagate on said path through the wave-guide and the working fluid from said first heat exchange means to said second heat exchange means.

7. The miniature heat engine as claimed in claim 1, in which said periodic acoustical traveling wave generating means causes periodic acoustical traveling waves to propagate through the compressible working fluid, the propagating waves causing pressure fluctuations that create periodic compression and expansion in the working fluid in contact with the heat exchange means that results in an exchange of thermal energy between the heat exchange means and the working fluid, thereby conveying thermal energy from said first heat exchange means to said second heat exchange means via the acoustical traveling waves.

8. The miniature heat engine as claimed in claim 1, in which the periodic acoustical traveling waves disturb the laminar boundary conditions existing at the interface between the working fluid and the heat exchange means, causing a periodic change in the rate of thermal energy flow between said heat exchange means and said working fluid.

9. The miniature heat engine as claimed in claim 1, or claim 8, in which the first heat exchange means injects thermal energy into periodic acoustical traveling waves in order to amplify the temperature and pressure gradients of said periodic acoustical traveling waves with respect to the static working fluid through which they are propagating.

10. The miniature heat engine as claimed in claim 1, in which said first and second heat exchange means have properties that have been manipulated, by means of engineering craft and process, so as to regulate the rate and periodicity of flow of thermal energy to and from the working fluid, said properties being specific, heat, sensible heat, latent heat, thermal conductivity, cross-sectional thickness, contact surface area and mass.

11. The miniature heat engine as claimed in claim 1, or claim 10, in which the first and second heat exchange means are further characterized by a property of thermal resonance that is manipulated so as to cause said first and second heat exchange means to couple thermodynamically most efficiently with periodic acoustical traveling waves of a given frequency, and less efficiently with the static working fluid through which said periodic acoustical traveling waves are propagating, the coupling efficiency directly affecting the rate of thermal energy transferred per unit time between the first and second heat exchange means and the working fluid.

12. The miniature heat engine as claimed in claim 1, in which the cross-sectional area of the wave-guide increases in the direction of wave propagation, the geometric flare of said wave-guide tending to propagate and vector the periodic acoustical traveling waves in one direction as the pressure gradient in said periodic acoustical traveling waves propel them toward areas of greater volume and less pressure.

13. The miniature heat engine as claimed in claim 1, in which the wave-guide is an integral part of the first heat exchange means, said first heat exchange means causing thermal energy to be injected into the periodic acoustical traveling waves as they traverse and expand through the wave-guide, thereby increasing the temperature ad pressure gradient in said periodic acoustical traveling waves.

14. The miniature heat engine as claimed in claim 1, or claim 12, or claim 13, in which the acoustic wave-guide integral with said first heat exchange means causes the periodic acoustical traveling waves to be vectored from said first heat exchange means to said second heat exchange means by controlling the acoustic path impedance so that one direction of acoustic wave propagation is favored, and further causes the propagation velocity and amplitude of said periodic acoustical traveling waves to be increased by injection of thermal energy into the working fluid, said amplitude being defined as the pressure-temperature gradient of the periodic acoustical traveling wave with respect to the static working fluid.

15. The miniature heat engine as claimed in claim 1, in which the energy conversion means is a linear alternator, comprised of a piston-armature assembly capable of reciprocating motion, in combination with a magnetic field generating means and electrical circuitry and so disposed in relation to one another that when said piston-armature assembly is caused to reciprocate by means of a fluctuating pressure gradient in the form of periodic acoustical traveling waves, said linear alternator produces alternating electrical current.

16. The miniature heat engine as claimed in claim 1, in which the inertance means is disposed between said second heat exchange means and the energy conversion means so as to cause the periodic acoustical traveling waves to slow and stall in the vicinity of the piston-armature assembly and said second heat exchange means, thereby giving up energy of inertial moment and causing periodic pressure-temperature peaks that mimic Stirling Cycle compressions in the working fluid.

17. The miniature heat engine as claimed in claim 1, or claim 16, in which the inertance means meters the acoustical and thermal energy in the stalled periodic acoustical traveling waves into said second heat exchange means, where the remaining energy is extracted from the working fluid and transmitted, via conduction, through the second heat exchange means section of the thermally conductive envelopment means, the engine housing, to an external heat sink.

18. A process comprising steps of:
a) using a new engineering craft, with unique formulae and terminology, for calculating, quantifying and evaluating thermodynamic coupling efficiency and thermoacoustic resonance in solid materials and compressible working fluids subjected to a periodic flow of thermal energy, b) manipulating the elemental and geometric properties of said solid material so as to cause heat exchange means to resonate and couple thermodynamically with a compressible working fluid via a periodic thermal energy flux of specific frequency, c) using a methodology for designing said heat exchange means, so as to cause an exchange of specific quantities of sensible and latent thermal energy between said heat exchange means and periodic acoustical traveling waves, thereby amplifying the pressure-temperature gradient of said periodic acoustical traveling waves with respect to the working fluid they are propagating through, d) using a methodology for calculating, quantifying and evaluating periodic thermal energy transmission through said solid material, and between said heat exchange means and a working fluid, in order to design and test thermoacoustic engines, e) determining a property of thermal impedance ($Z_t$), expressed as a reciprocal power in Joules per centimeter per square centimeter per degree Kelvin, to quantify the flow of alternating energy per unit time with regard to impeding properties of a component or system, f) determining a property of thermal capacitance ($C_t$), expressed in Joules per degree Kelvin, with regard to the quantity of thermal energy that can be stored in a component or system for a given amplitude of applied thermal energy, g) determining a property of thermomotive force, thermal amplitude, the temperature gradient across a thermoacoustic engine or component thereof, the difference in maximum and minimum temperatures across said thermoacoustic engine or component thereof, expressed in degrees Kelvin, h) determining a property of thermal reactance ($X_t$), expressed as a reciprocal power in Joules per second, with regard to the resistance of a component or system to a reversal in the direction of flow of thermal energy.

19. The process as claimed in claim 18, further comprising steps of manipulating the elemental physical properties of mass density, specific heat, latent heat and thermal conductivity inherent in the solid material of the heat exchange means, in conjunction with the geometry and disposition of said heat exchange means, and thereby caused to resonate at the atomic level by means of an oscillating flow of the thermal energy, the period and amplitude of the thermal energy oscillation being determined by the thermodynamic coupling efficiency, as measured by the ratio of thermal energy throughput versus the amplitude of the thermal energy oscillation, between the oscillating energy flow in the working fluid and the oscillating flow of thermal energy in the solid matter.

20. The process as claimed in claim 18, or claim 19, further comprising steps of using an engineering craft, by which elements comprising said heat exchange means are manipulated and combined into alloys and compounds having specific geometry, mass to surface-area ratios, specific heat, latent heat, thermal conductivity, surface chemistry, thermal reactance, thermal impedance and thermal capacitance, so as to amplify periodic acoustical traveling waves propagating in the compressible working fluid.

* * * * *